United States Patent [19]

Azuma et al.

[11] Patent Number: 5,163,293
[45] Date of Patent: Nov. 17, 1992

[54] AXLE DRIVING APPARATUS WITH VARIABLE DEPTH CRESCENT OIL PASSAGES

[75] Inventors: Toshiro Azuma, Minoo; Hideaki Okada, Takarazuka; Ryota Ohashi, Kobe, all of Japan

[73] Assignee: Kanzaki Kokyukoki Mfg. Co. Ltd., Amagasaki, Japan

[21] Appl. No.: 717,477

[22] Filed: Jun. 19, 1991

[30] Foreign Application Priority Data

Jun. 26, 1990 [JP] Japan .................................. 2-167584

[51] Int. Cl.⁵ .............................................. F16D 39/00
[52] U.S. Cl. ...................................................... 60/487
[58] Field of Search .......................... 60/487, 489, 490; 91/484, 485, 499, 506; 251/208

[56] References Cited

U.S. PATENT DOCUMENTS

| | | | |
|---|---|---|---|
| 2,874,533 | 2/1959 | Schott | 60/489 X |
| 3,360,933 | 1/1968 | Swanson et al. | 60/464 |
| 3,751,924 | 8/1973 | Brown et al. | 60/484 |
| 4,891,943 | 1/1990 | Okada | 60/464 |
| 4,903,545 | 2/1990 | Louis et al. | 60/487 X |
| 4,914,907 | 4/1990 | Okada | 60/487 |
| 4,932,209 | 6/1990 | Okada et al. | |
| 5,010,733 | 4/1991 | Johnson | 60/489 X |

FOREIGN PATENT DOCUMENTS

| | | | |
|---|---|---|---|
| 1075915 | 2/1960 | Fed. Rep. of Germany | 60/487 |
| 631225 | 11/1961 | United Kingdom | 91/506 |

*Primary Examiner*—Edward K. Look
*Assistant Examiner*—John Ryznic
*Attorney, Agent, or Firm*—Sterne, Kessler, Goldstein & Fox

[57] ABSTRACT

An improvement in the conventional axle driving apparatus in which a pair of crescent oil passages open at a motor mounting surface of a center section are formed across an upper half casing and a lower half casing.

The improved axle driving apparatus of the present invention is designed to uniformly disperse and receive by the upper and lower half casings the radial load acting on the swash plate holder formed across the joint surface between both the upper and lower half casings, thereby expecting a low manufacturing cost of the axle casing.

3 Claims, 7 Drawing Sheets

5,163,293

AXLE DRIVING APPARATUS WITH VARIABLE DEPTH CRESCENT OIL PASSAGES

FIELD OF THE INVENTION

The present invention relates to an axle driving apparatus which houses in an axle casing an HST system transmission attached to part of axle of a vehicle.

BACKGROUND OF THE INVENTION

The conventional axle driving apparatus which constructs an axle casing by coupling an upper half casing and a lower half casing which are dividable along the axis of axle shaft, and mounts in the axle casing in relation of approximately aligning the axis of motor shaft with the joint surface of casing a center section for vertically mounting a hydraulic pump and horizontally mounting a hydraulic motor, is well known as disclosed in the Japanese Utility Model Laid-Open Gazette Hei 1-154358, Patent Laid-Open Gazette Hei 1-309821 and Specification of U.S. Pat. Nos. 4,914,907, 4,932,209 and 4,903,545.

SUMMARY OF THE INVENTION

In the conventional axle driving apparatus, a pair of crescent oil passages open at the motor mounting surface of a center section are so formed that both the crescent oil passages extend toward an upper half casing and a lower half casing beyond the boundary of joint surface therebetween.

The inclining direction of a thrust bearing held to a swash plate holder with respect to a motor shaft is decided to project a piston to a maximum when the bearing transfers from one crescent oil passage to the other and to retract to a maximum when the sme transfers vice versa.

A radial load generated when the piston head moves along the slide surface of thrust bearing, always acts on the swash plate holder toward the maximum retracting side of piston through the thrust bearing regardless of the rotation direction of a hydraulic motor.

Accordingly, when the above-mentioned crescent oil passages are disposed as conventional, the radial load acting on the swash plate holder, regardless of forward or backward movement, is adapted to be received collectively and always by one half casing during the rotation of hydraulic motor.

Therefore, at the joint of the upper half casing and lower half casing and at the supporting portion for the swash plate holder constructed across both the casings, one half casing must be increased in thickness thereof or changed of material thereof so as to improve rigidity of the one half casing. Also, therefore, the axle casing has had a high cost of manufacture.

The present invention is designed to uniformly disperse and receive by the upper half casing and lower half casing the radial load acting on the swash plate holder constructed across the joint between the upper half casing and lower half casing, thereby expecting a low manufacturing cost of the axle casing.

DESCRIPTION OF THE PREFERRED EMBODIMENT

The problem of the present invention to be solved and means for solving it are the above-mentioned. Next, explanation will be given on an embodiment shown in the accompanying drawings.

Figure 1:
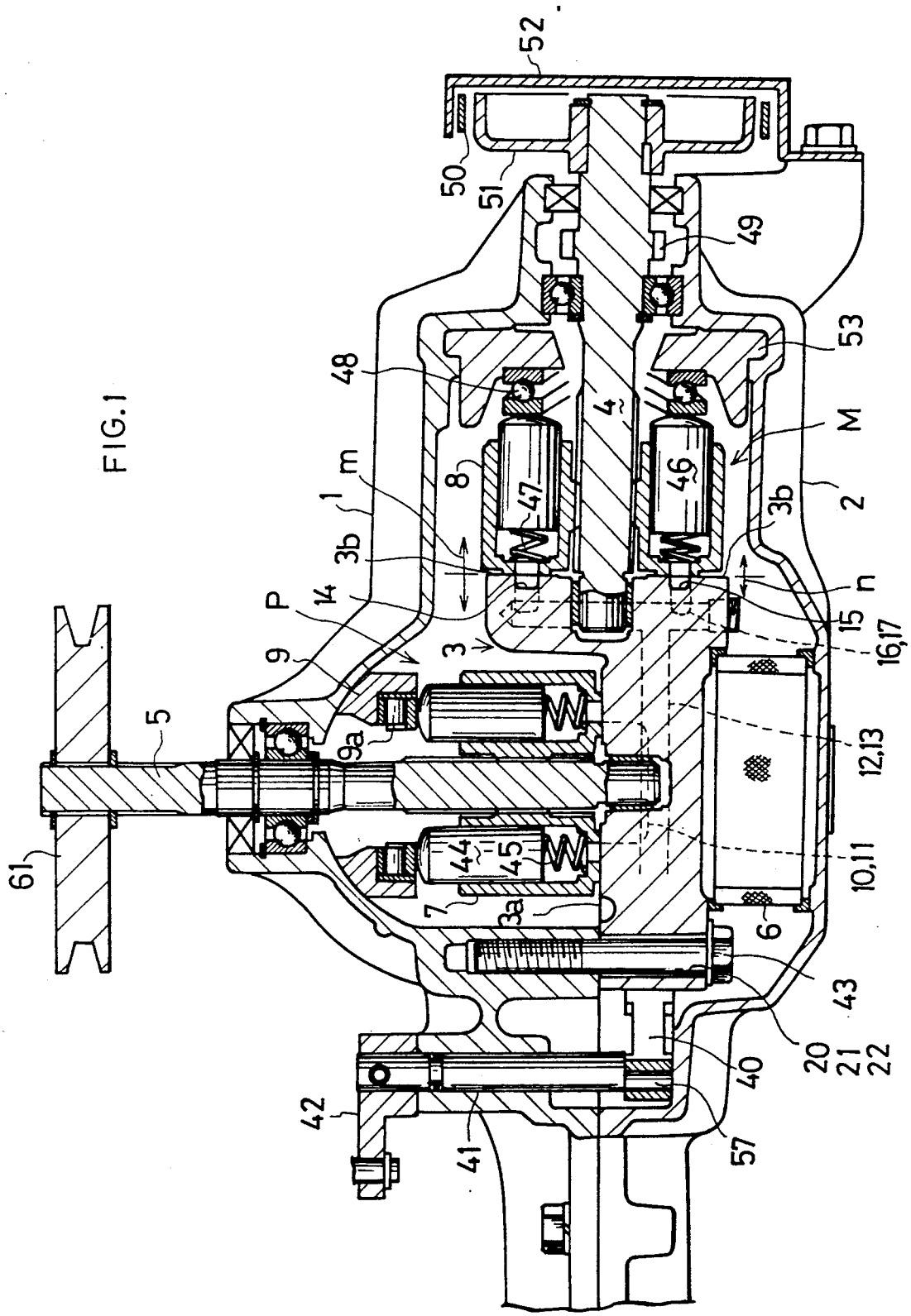
FIG. 1 is a sectional rear view on the center line of a pump shaft 5 and a motor shaft 4 of an axle driving apparatus of the invention.
Figure 2:
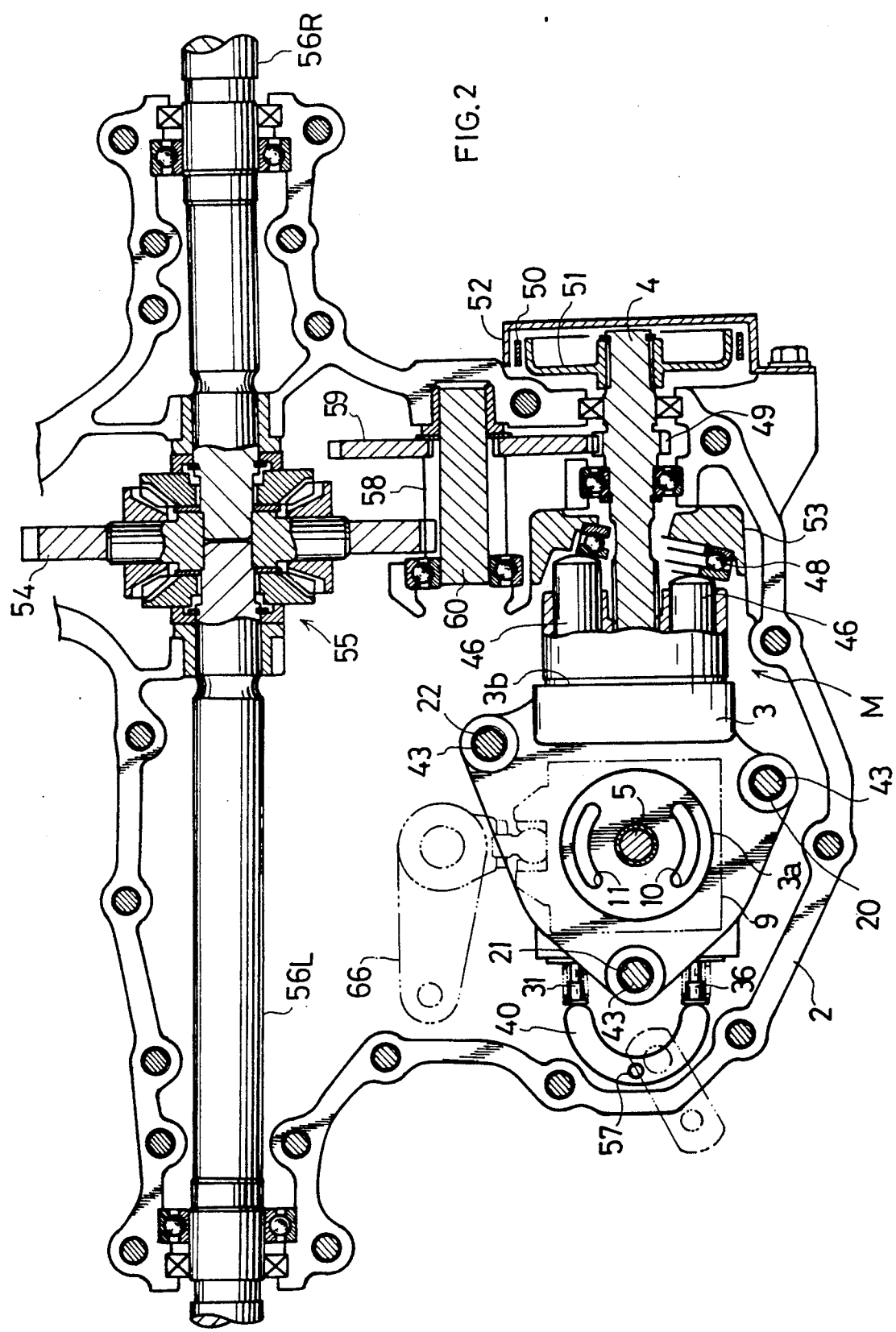
FIG. 2 is a plan view of the same, from which an upper half casing is removed.

FIGS. 1 and 2 show entire construction of the axle driving apparatus of the invention.

An axle casing of the present invention is vertically divided into an upper half casing 1 and a lower half casing 2 on the axes of left and right axles 56L and 56R and bearings therefor are interposed on the divided surfaces so as to couple both casings, thereby constituting a sealed axle casing.

At the joint surfaces of the upper half casing 1 and lower half casing 2, a bearing for a motor shaft 4 can be assembled in a sandwiching manner therebetween. The joint surface of the upper half casing 1 is made wide below and its lower surface is formed in the mounting surface for the upper surface of the center section 3.

Figure 6:
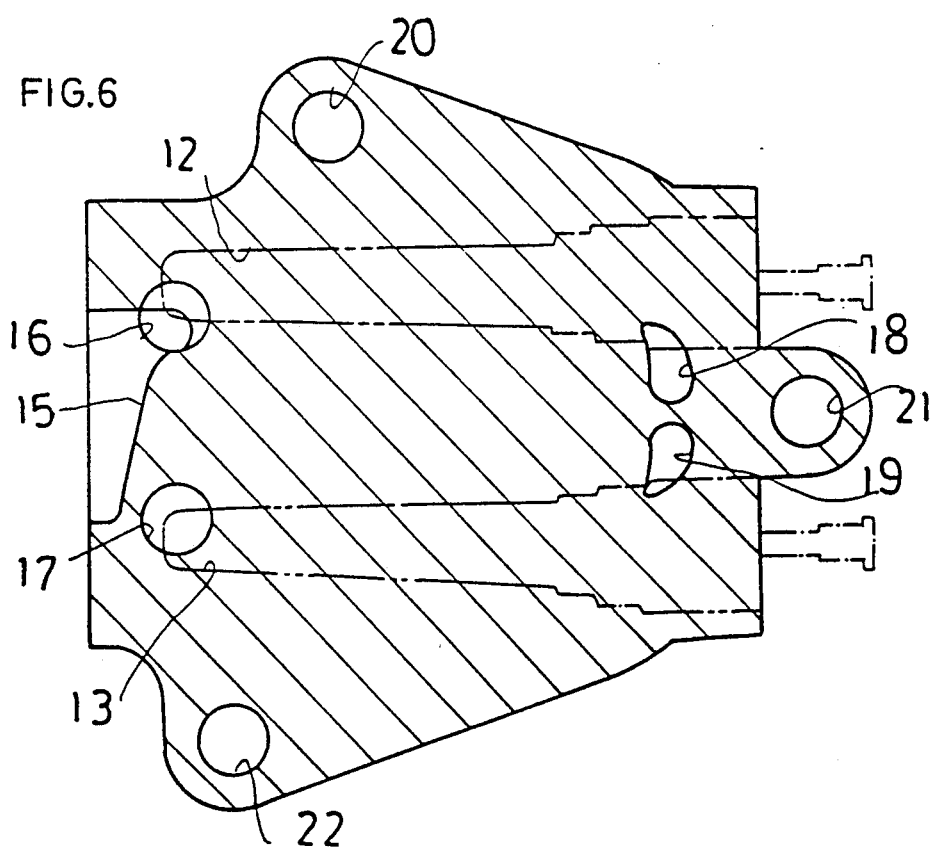
FIg. 6 is a sectional view taken on the lines C—C in FIGS. 3 and 8.

The center section 3, as shown in FIGS. 2 and 6, has bolt mounting bores 20, 21 and 22, so that mounting bolts 43 are inserted therein and fixed to the center section mounting surface formed of the lower surface of upper half casing 1.

The center section 3 is L-like-shaped in sectional side view and the horizontal upper surface thereof is formed in a pump mounting surface 3a, onto which is disposed a variable displacement hydraulic pump P comprising a pump casing 7, pump pistons 44, piston biasing springs 45, a pump shaft 5, and a movable swash plate 9.

The movable swash plate 9 is formed at the abutting surface thereof against the heads of pistons 44 of thrust bearings 9a, contacts at the hemispherical upper surface of the swash plate 9 with the inner surface of the upper half casing 1, and is made swingable in order to manually change an angle of swash plate. Reference numeral 66 designates a speed-change arm which rotates the movable swash plate 9 for speed change. The pump shaft 5 perforates at the upper portion thereof through the upper half casing 1 and projects therefrom to the exterior and an input pulley 61 is fixed to the upper portion of pump shaft 5, and is journalled on the way to the upper half casing 1. The lower end of the same is journalled to a bearing bore provided at the center of the pump mounting surface 3a of center section 3.

The vertical surface of center section 3 is formed at a motor mounting surface 3b, to which is mounted a fixed capacity type hydraulic motor M comprising a motor shaft 4, a motor case 8, motor pistons 46, piston springs 47, a swash plate holder 53, and a thrust bearing 48.

The swash plate holder 53 is manufactured by die casting of non-machining, in which the thrust bearing 48 is held in relation of inclining at a predetermined angle with respect to the axis of motor shaft 4, the holder 53 being fixed in a sandwiching manner at the joint portion between the upper half casing 1 and the lower half casing 2. One end portion of motor shaft 4 at the center section 3 side is pivotally supported to the central portion of the motor mounting surface 3b of center section 3, on the way of the other end poriton of the motor shaft 4 is fixed a brake drum 51 for the upper half casing 1 and lower half casing 2, a brake band 50 for braking the brake drum 51 is disposed at the outer periphery of the brake drum 51, and a brake casing 52 covers the brake drum 51 and brake band 50.

As shown in FIG. 2, a toothed gear 49 is fixed onto the motor shaft 4 and engages with a larger diameter gear 59 at a counter shaft 60, and a smaller diameter gear 58 thereon engages with a ring gear 54 at a differential gear 55, thereby transmitting power, so that the differential gear 55 drives axles 56L and 56R.

In FIG. 1, a cylindrical oil filter 6 abuts against the lower surface of center section 3 of an approximately L-like shape, and is put between the center section 3 and the upper surface of a bottom wall of lower half casing 2.

The oil filter 6 serves to clean oil stored in the axle casing so as to use it as operating oil for hydraulic pump P and hydraulic motor M.

A pressure release mechanism for a HST system transmission for opening operating oil supplying check valves 29 and 34 provided within the center section 3 when a vehicle loading thereon the axle driving apparatus of the present invention is tractive-running, is constituted.

In detail, the pressure release mechanism comprises a pressure release arm 42, an eccentric pin 57, a biasing rod 40, and push rods 31 and 36.

Next, in FIGS. 3 through 8, explanation will be given on the construction of center section 3 and an oil passage constituting a closed circuit.

The pump mounting surface 3a of center section 3 is horizontal in parallel to the axles 56L and 56R, on which the crescent oil passages 10 and 11 are open. The motor mounting surface 3b is positioned across the upper half casing 1 and lower half casing 2, and a pair of crescent oil passages 14 and 15 open at the motor mounting surface 3b, as seen from FIG. 3, are formed in such a manner that one crescent oil passage 14 is positioned at the upper half casing 1 and the other crescent oil passage 15 at the lower half casing 2.

The crescent oil passages 10 and 11 and those 15 and 14 are communicated through oil passages in the center section 3 and operating oil circulates between the hydraulic pump P and the hydraulic motor M respectively.

In order to communicate the crescent oil passages 10 and 11 at the bottoms intersecting with each other on the way, a pair of horizontal oil passages 12 and 13 extending in parallel to the pump mounting surface 3a are open from the reverse side to the motor mounting surface 3b, the foremost ends of horizontal oil passages 12 and 13 do not perforate directly to the motor mounting surface 3b, but end on the way and the oil passages 12 and 13 communicate with a short vertical oil passage 16 and a long oil passage 17 intersecting therewith on the way, the vertical oil passages 16 and 17 being closed at open ends with blind plugs 24 and 23 respectively.

Figure 3:
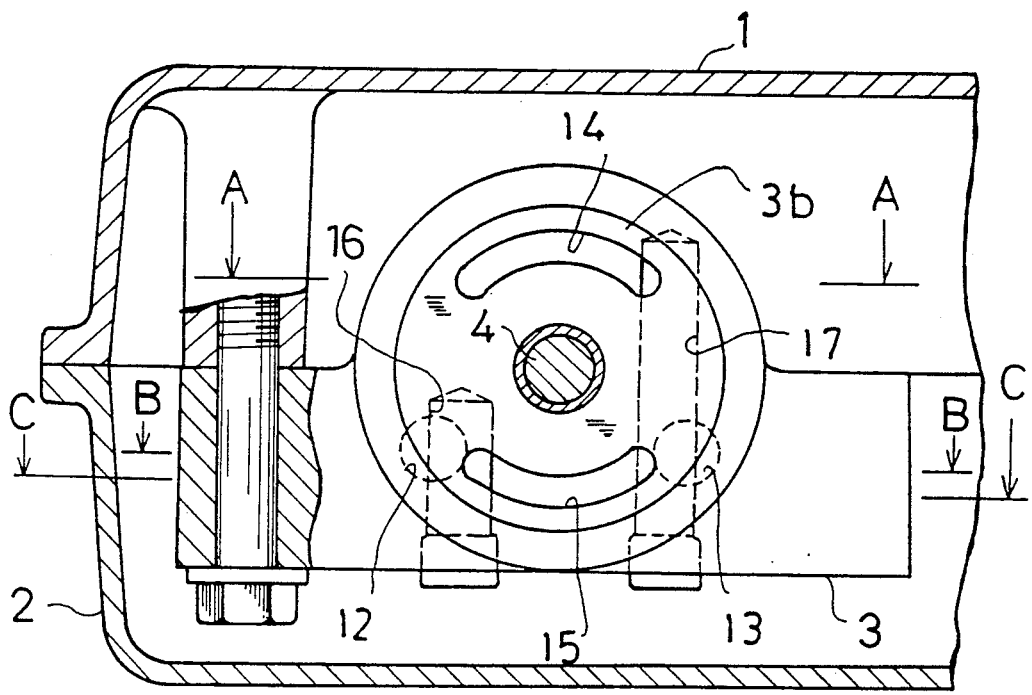
FIG. 3 is a side view of a center section 3 at the motor mounting surface side.
Figure 4:
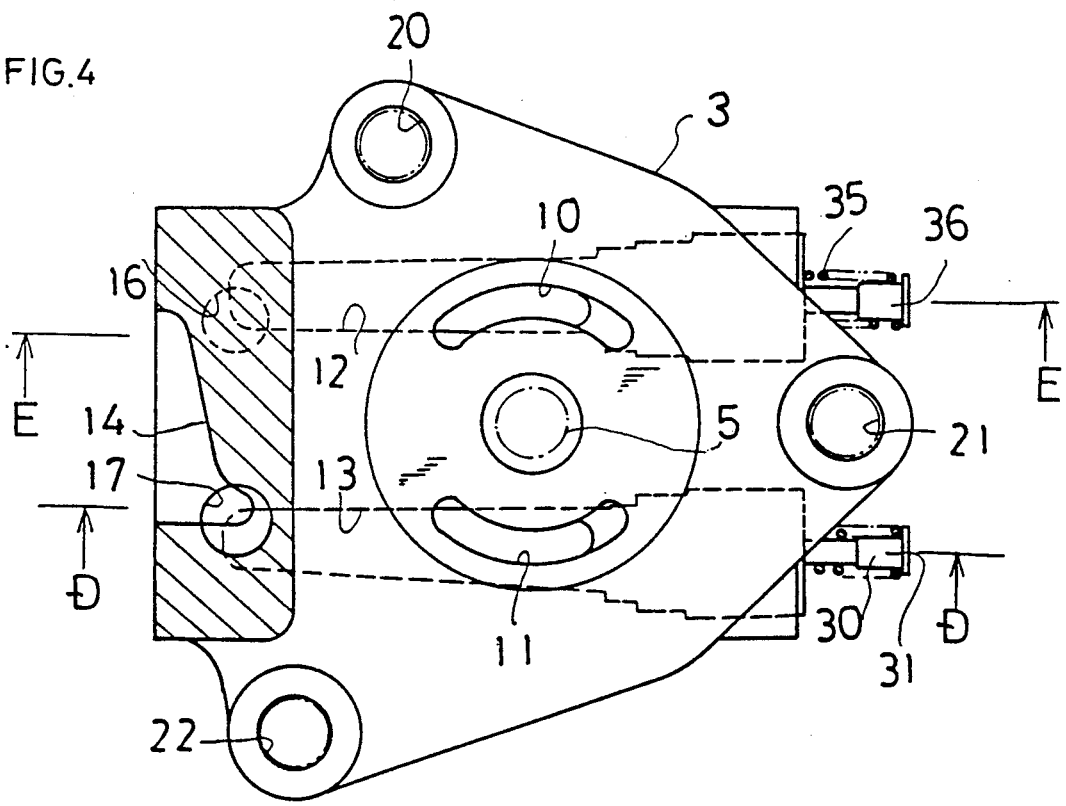
FIG. 4 is a sectional view taken on the lines A—A in FIGS. 3 and 7.
Figure 5:
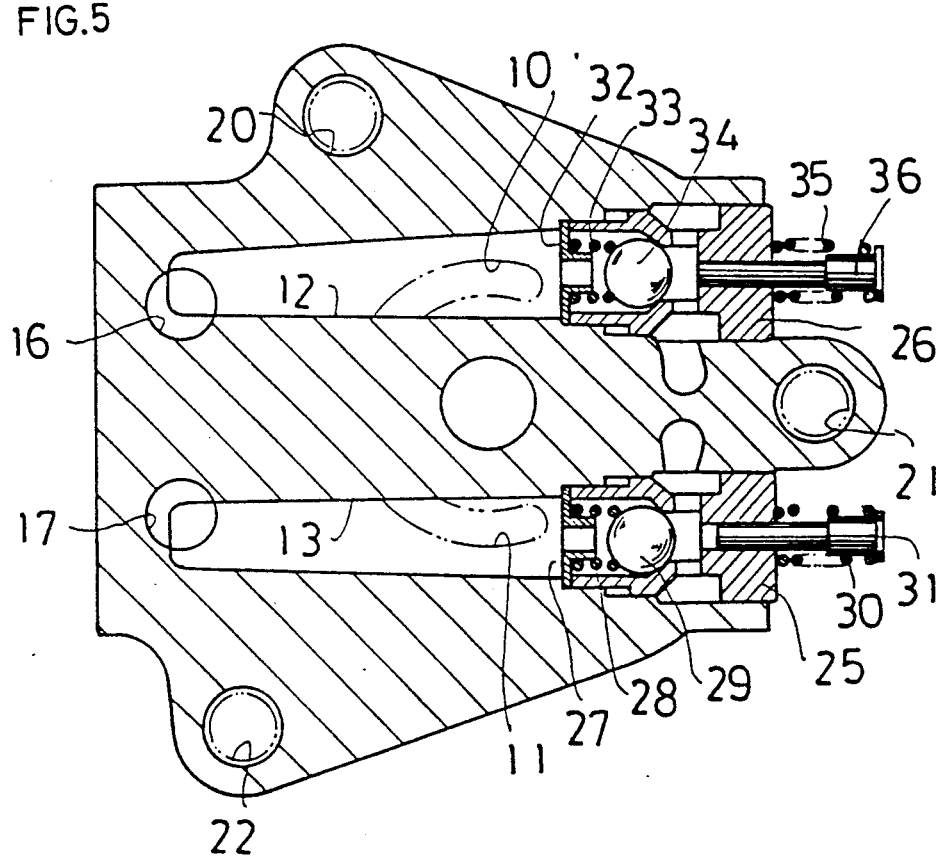
FIG. 5 is a sectional view taken on the line B—B in FIG. 3.

As shown in FIG. 3, the vertical oil passages 16 and 17 communicate intersecting on the way with the bottoms of crescent oil passages 15 and 14 respectively.

When the hydraulic motor M rotates in the direction of forward moving the vehicle loading thereon the axle driving apparatus of the present invention, the crescent oil passage 15 is set to serve as the high pressure side oil passage and that 14 as the low pressure side oil passage, and, when the same rotates in the direction of backward moving the vehicle, the crescent oil passage 14 is set to serve as the high pressure side oil passage and that 15 as the low pressure side oil passage.

Figure 7:
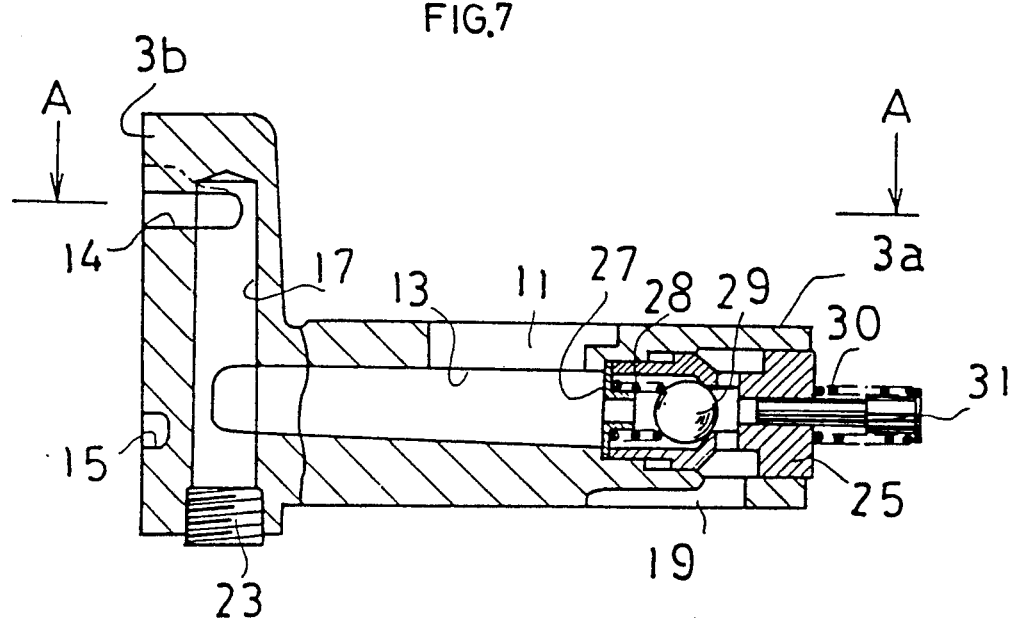
FIG. 7 is a sectional view taken on the line D—D in FIG. 4.

The crescent oil passage 14, as shown at the upper side in the FIG. 7 plan view, communicates with a vertically long vertical oil passage 17, and the crescent oil passage 14 at the communication portion thereof with the vertical oil passage 17 is deeply bored and formed in an oil passage shallowly bored as it approaches the foremost end. The vertical oil passage 16 is bored at the position apart from the shallow foremost end.

Figure 8:
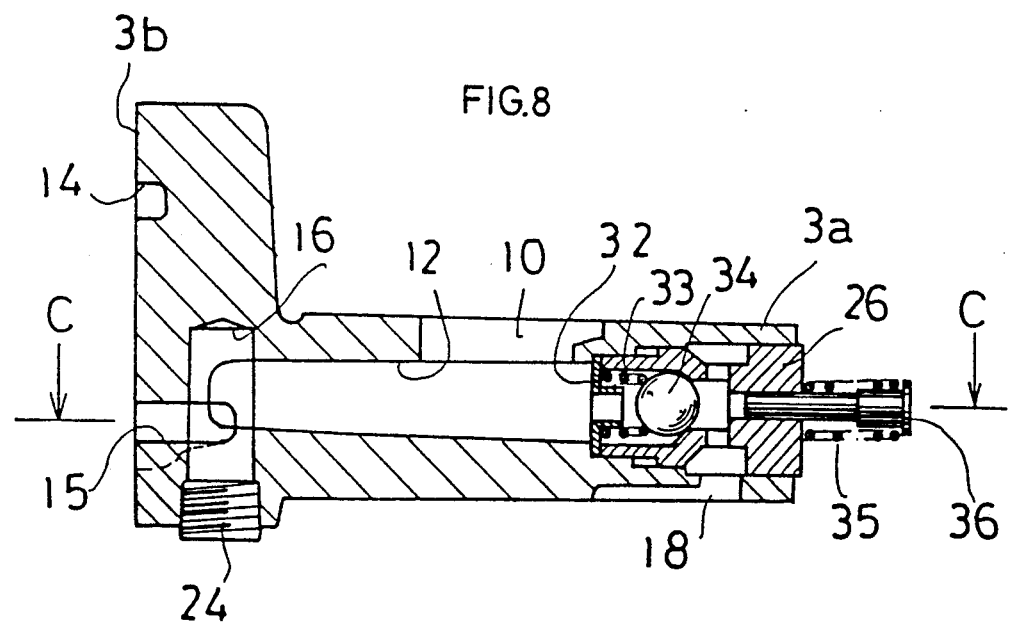
FIG. 8 is a sectional view taken on the line E—E in FIG. 4.

The crescent oil passage 15 at the lower side, as shown in FIG. 8, communicates with a vertically short vertical oil passage 16, which is formed in a cast oil passage in such a manner that the crescent oil passage 15 at the communicating portion thereof with the vertical oil passage 16 is deeply bored and the foremost end is formed in a cast oil passage shallowly bored to enable the vertical oil passage to be bored.

In addition, the vertical oil passages 16 and 17 in the embodiment are bored by machining, but may be formed in cast oil passages not by machining but by casting the center section 3 by use of a lost-form method.

The horizontal oil passages 12 and 13 each are formed in a bore the largest in diameter at the opening end and gradually smaller toward the depth, the check valves 29 and 34 used also as the pressure release mechanism being disposed at the openings of the same respectively.

The pressure release mechanism and check valves 29 and 34 are constituted in such a manner that at first spring stoppers 27 and 32 are inserted into the larger diameter openings at the horizontal oil passages 12 and 13, biasing springs 28 and 33 are inserted into the same, the check valves 29 and 34 are supported to the biasing springs 28 and 33, valve sheat plugs 25 and 26 are inserted into the same, and push rods 31 and 36 are inserted into the plugs 25 and 26 through biasing springs 30 and 35 respectively.

And, a bifurcate lever 40 abuts against the push rods 31 and 36 and is pushed by an eccentric pin 57, whereby the push rods 31 and 36 simultaneously push the check valves 29 and 34 to be open.

As shown in FIGS. 7 and 8, oil suction openings 19 and 18 are bored below the inlets of check valves 29 and 34 and open within the aforesaid oil filter 6.

Therefore, in a case where operating oil in the center section 3, hydraulic pump P and hydraulic motor M, decreases so as to generate negative pressure in the closed circuit, the check valves 29 and 34 are open through the oil suction openings 19 and 18 corresponding to the low pressure side, thereby supplying lubricating oil as the operating oil into the horizontal oil passages 12 and 13 respectively.

Incidentally, the push rods 31 and 36 are provided so that the operating oil supplying check valves 29 and 34 are directly used also as the valves for the pressure release mechanism.

In a case where the pressure release mechanism forcibly opens the check valves 29 and 34, the axles 56L and 56R rotate when the vehicle loading the present axle driving apparatus is hauled, thereby enabling pressure oil generated at part of hydraulic motor M to be entirely released.

Figure 11:
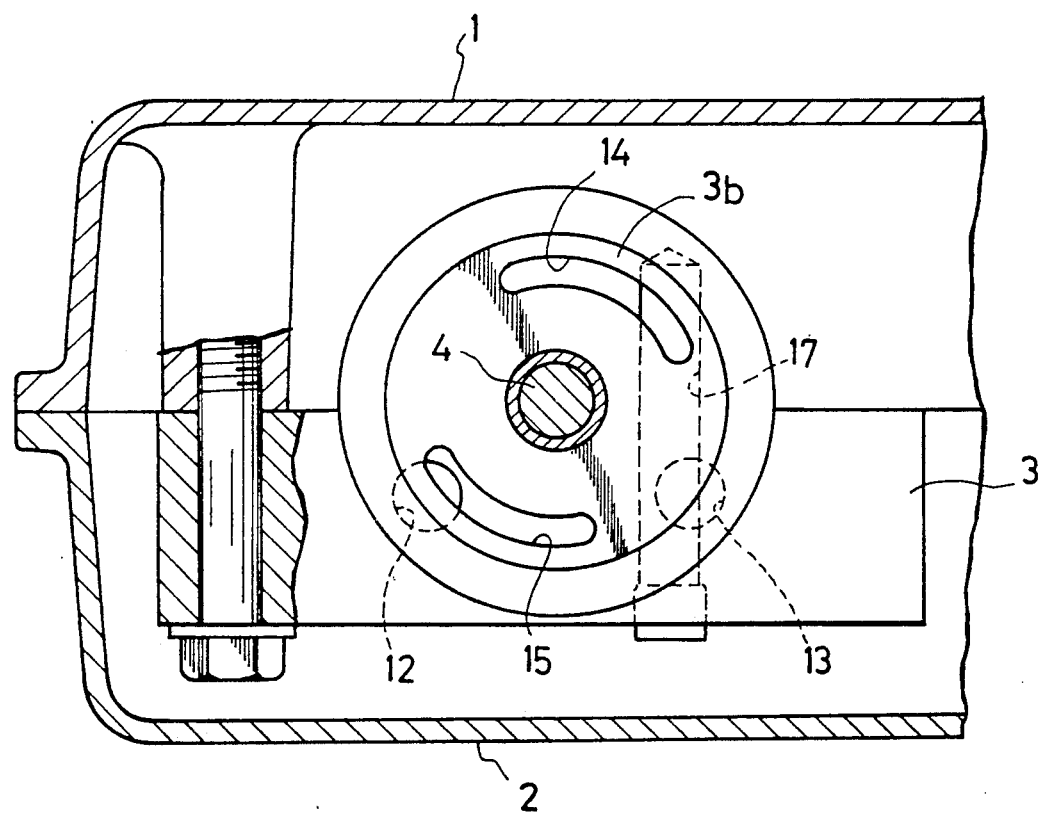
FIG. 11 is a view showing a maximum allowance positition of crescent oil passages.

In addition, in the present invention, the range of positioning the crescent oil passages 14 and 15 in the respective half casings 1 and 2 includes those shown in FIG. 11.

The present invention constituted as the above-mentioned has the following effects:

In detail, the axle casing is constructed by coupling the upper half casing 1 with the lower half casing 2 which are made dividable along the axis of the axle, and the about L-like-shaped center section 3 on which the hydraulic pump P is vertically and the hydraulic motor M is horizontally mounted in relation of approximately aligning the axis of the motor shaft 4 with the joint surface of both the casings. In such construction one of the pair of crescent oil passages 14 and 15 open at the motor mounting surface 3b of the center section 3 is positioned at the upper half casing 14 and the other at the lower half casing 15, so that, when the motor pistons 46 are positioned between the crescent oil passages 14 and 15, in other words, on the joint surface between the upper and lower half casings 1 and 2 as shown in the FIG. 2 plan view, the thrust bearing 48 is slanted in the direction of projecting or retracting to a maximum with respect to the motor shaft 4.

Figure 9:
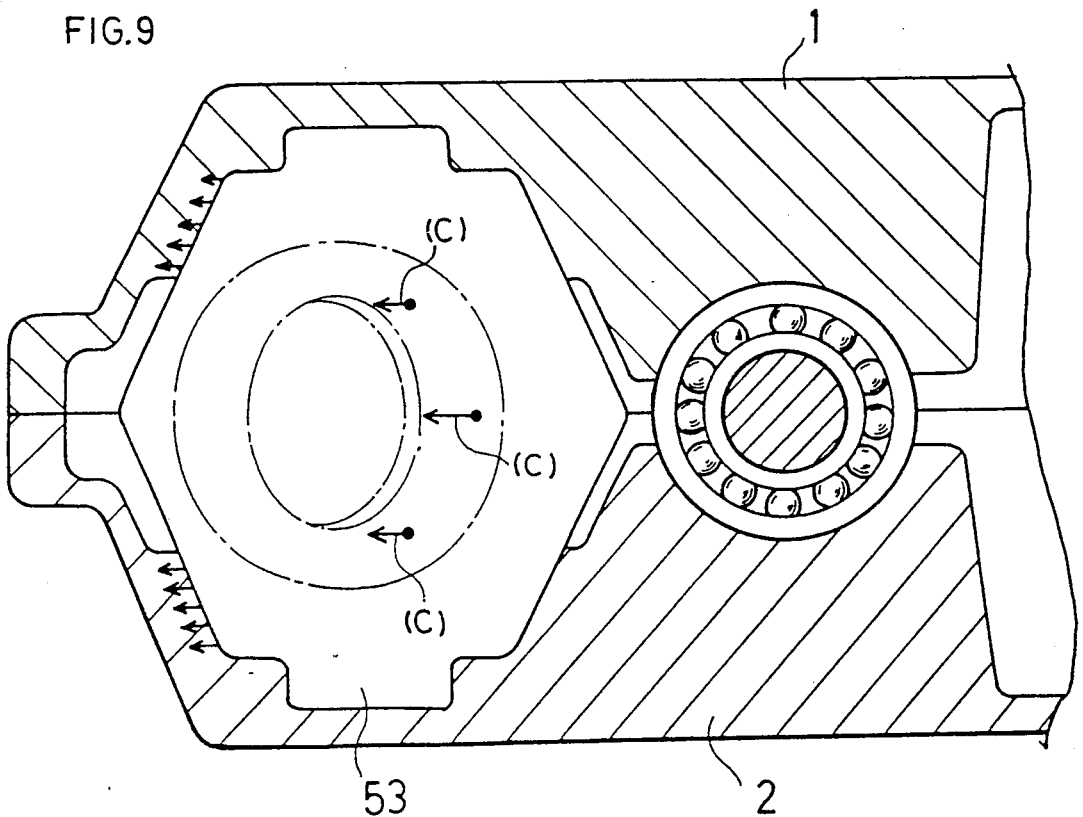
FIG. 9 is a typical view showing condition of applying a force on a thrust bearing 48.
Figure 10:
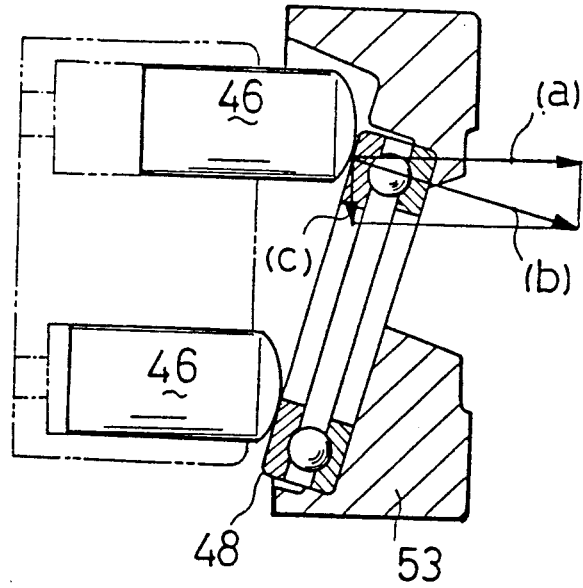
FIG. 10 is a typical view showing condition of applying a force on the thrust bearing 48.

Accordingly, as shown in FIG. 9, a radially generated load C when the heads of motor pistons 46 move along the slide surface of thrust bearing 48, always acts on the swash plate holder 53 and toward the maximum retracting side through the thrust bearing 48 regardless of the rotation direction of hydraulic motor M. Therefore, the load C, as shown, can be uniformly diversed and received by both the upper and lower half casings 1 and 2 sandwiching therebetween the swash plate holder 53.

Hence, there is no need that the one side half casing is made larger in thickness or changed of its material so as to improve the rigidity, so that the axle casing can be formed of the same material thereby being inexpensive to produce.

Furthermore, when the upper half casing 1, lower half casing 2 and swash plate holder 53 are intended to be cast without machining, accuracy for fitting the swash plate holder 53 is not sufficiently obtained to cause a backlash thereof in the upper or lower half casing 1 or 2, but the present invention is adopted to be effective in that a load c in the thrust direction and given from each motor piston 46 presses the swash plate holder 53 to eliminate the backlash.

When it is constructed that the upper crescent half oil passage 14 serves as the high pressure oil passage when the vehicle moves backward and the lower half oil passage 15 serves as the same when the vehicle moves forward, since the center section 3 is about L-like-shaped, the upper half thereof at the motor mounting surface 3b is smaller in thickness and weaker in strength than the lower half of the same directly formed at part larger in thickness of pump mounting surface. Hence, even when the crescent oil passages of the present invention are disposed on such the motor mounting surface 3b, the oil passage serving as the high pressure side at the forward movement higher in frequency of use is set at the crescent oil passage 15 positioned at the lower half of motor mounting surface 3b and that serving as the high pressure side at the backward movement lower in the same is set at the crescent oil passage 14 positioned at the upper half of motor mounting surface 3b, thereby being effective because there is no need that rigidity of upper half of motor mounting surface 3b at the center section 3 is especially increased.

In the crescent oil passages 14 and 15, when the upper side crescent oil passage 14 is constructed to become the high pressure oil passage during the backward movement of vehicle and the lower side crescent oil passage 15 to be high pressure oil passage during the forward movement of the same, pressure oil smoothly flows between the hydraulic pump and the hydraulic motor, whereby volume efficiency can be improved to restrict generation of cavitation and to reduce noises.

What is claimed is:

1. An axle driving apparatus, comprising:
   a transmission casing including an upper casing joined to a lower casing;
   an axle disposed in parallel to the joint of said upper casing and said lower casing;
   a substantially L-shaped center section fixed within said transmission casing, said center section including a pump mounting surface and a motor mounting surface;
   a hydraulic pump vertically mounted on said pump mounting surface;
   a hydraulic motor including a motor shaft having an axis, said motor horizontally mounted on said motor mounting surface so that the axis of said motor shaft is substantially aligned with the joint of said upper casing and said lower casing;
   a swash plate disposed between said upper casing and said lower casing;
   an upper oil passage disposed within said center section in said upper casing opposite to said swash plate and open to said motor mounting surface, said upper oil passage in fluid communication with said pump; and
   a lower oil passage disposed within said center section in said lower casing opposite to said swash plate and open to said motor mounting surface, said lower oil passage in fluid communication with said pump.

2. An axle driving apparatus as recited in claim 1, wherein said upper oil passage carries high pressure oil when said axle rotates in the direction corresponding to backward movement of a vehicle, and said lower oil passage carries high pressure oil when said axle rotates in the direction corresponding to forward movement of the vehicle.

3. An axle driving apparatus as recited in claim 1, further comprising a first oil passage and a second oil passage, wherein said first and said second oil passages are in fluid communication with said pump, and wherein said upper oil passage is bored to be gradually deeper at one end of said upper oil passage, and said lower oil passage is bored to be gradually deeper at an end opposite to said one end of said upper oil passage, wherein said first oil passage is in fluid communication with said deeper end of said lower oil passage, and said second oil passage is in fluid communication with said deeper end of said upper oil passage.

* * * * *